Patented Feb. 24, 1925.

1,527,246

UNITED STATES PATENT OFFICE.

HARRY C. BICKMORE, OF ATLANTA, GEORGIA.

INSECTICIDE.

No Drawing.   Application filed November 24, 1922.   Serial No. 603,102.

*To all whom it may concern:*

Be it known that I, HARRY C. BICKMORE, a citizen of United States, residing at Atlanta, in the county of Dekalb and State of Georgia, have invented new and useful Improvements in Insecticides, of which the following is a specification.

The present invention concerns an insecticide which is especially adapted for the treatment of cotton plants, and also embraces the treatment of cotton plants, in order to destroy weevils thereupon.

Various treatment of cotton plants in the territory infested by weevils have been proposed, but in spite of these, and in spite of the expenditure of millions of dollars by the U. S. Department of Agriculture and by departments of agriculture in the various cotton growing States, the weevil has constantly spread, and the area infested by weevils has constantly grown.

The insecticide which forms one of the objects of the present invention is an emulsion and is preferably prepared as follows:

*Step 1.*—8 ounces of suet or tallow or other relatively hard grease, preferably of animal origin are mixed with 3 drams of caustic potash and a small amount of water, and the mixture is then heated to boiling to produce a kind of soft soap, which may be of a consistency resembling petrolatum. This soft soap mixture is then mixed with a hydrocarbon oil of about the gravity of ordinary kerosene, or say between 36 and 44° Bé., and with petroleum ether or say any light petroleum distillate having a gravity of 60° Bé., or say between 55 and 65° Bé. With the above amount of the soft soap I preferably use about 1 gallon of the kerosene and 1 gallon of the petroleum ether. These are mixed together thoroughly in order to produce a relatively stiff emulsion.

*Step 2.*—A separate emulsion is made by intimately mixing 1 gallon of a fatty oil of a not readily drying character, such as fish oil or cotton seed oil, with one gallon of saturated lime water (an aqueous solution of calcium hydroxid). This mixture is thoroughly agitated to produce an emulsion.

*Step 3.*—The two emulsions above described are then mixed together with a sufficient amount of additional water to make 8 gallons of the mixture. This mixing should be done in a tank or barrel provided with a high speed mechanical agitator in order to produce a thorough and complete emulsion.

It will be understood that the above method is given as the preferred method of producing the emulsion from the stated materials although it will be understood that the emulsion can be prepared from these materials by other methods.

This emulsion is then applied to the cotton plants in any desired manner, for example by means of an ordinary sprayer. The spray is then allowed to dry on the plant.

Heretofore the cotton plants have been sprayed with various insecticidal materials, and the plants have been otherwise treated with insecticidal materials, in most cases the first treatment being about the time of formation of the first squares, but in accordance with the present invention I find it very advisable to begin the treatment much earlier in the season, and preferably before the formation of the first buds on the cotton plants. Heretofore the weevils were allowed to puncture the first buds on the cotton plants, which has had the effect of greatly stunting the growth of the plants and thereby preventing full development of the plant and preventing the formation of the normal number of bolls which a given plant might produce, if there were no weevils. Accordingly, in order to be on the safe side, I begin spraying before the appearance of the boll weevil in the cotton field or before the appearance of the boll weevils in any substantial numbers. The spray mixture above referred to can be used at the concentration above given, although it is sometimes advisable to dilute the material somewhat further, before applying it as a spray, particularly at the beginning of the season, when the plants are young and relatively tender. It will be understood that a spraying outfit can be carried upon a plow or cultivator which is used in working the cotton crop, and the same cultivator may carry two or more nozzles for spraying two or more rows of the cotton plants a single trip. This is given as one suitable spraying device, but the invention is not restricted thereto. In many cases it is advisable to use a spraying device in which the spray is projected upwardly from near the ground, against and upon the under side of the leaves of the cotton plant. Experiments have demonstrated that with the above treatment the plants can grow to maturity.

I have above referred to the use of cotton seed oil and fish oil as being the preferred forms of oils to be used. These do not have to be highly purified, these oils, as is well known, possess a very slight drying quality, but they are not regarded as drying oils. Such oils as linseed oil, rape oil and the like, which are good drying oils, are not so suitable for use in preparing the spray composition. I am aware that the various emulsions containing some of the above ingredients have been heretofore proposed for spraying vegetation, but I am not aware of any prior use of any emulsion containing all of the ingredients above given.

The emulsion has been described above for application to cotton boll weevils. It can be used also to destroy other forms of insect life, examples of other insects to which it can successfully be applied are plant lice, corn weevils, potato bugs, ants, roaches, bed bugs, bean weevils, tobacco worms, squash bugs, cucumber beetles, canker worms, cater-pillars and many other kinds of insects, but is non-injurious to man or beast.

I claim:

1. An insecticide in the form of an emulsion comprising the reaction products of hydrocarbon oils, fatty oil of a not readily drying character, hydrated lime, and alkali metal soap, carried in an aqueous vehicle.

2. An insecticide composition comprising the reaction products of a hydrocarbon oil of about 36 to 44° Bé., light hydrocarbon of about 55 to 65° Bé., fatty oil of a not readily drying character, lime water, and potash soap, carried in an aqueous vehicle.

3. An insecticide containing the reaction products, in the form of an emulsion, of the following materials, in substantially the proportions stated, namely: 1 gallon of kerosene, 1 gallon of petroleum ether, 1 gallon of fatty oil of a not readily drying character, 1 gallon of lime water, 8 ounces of relatively hard grease, 3 drams of potassium hydroxid, together with sufficient water to make about 8 gallons of emulsion.

4. A process which comprises the step of spraying cotton plants with an insecticidal emulsion comprising the reaction products of alkali metal soap, hydrocarbon oil, lime water, fatty oil of a not readily drying character and an aqueous vehicle, before the first appearance of boll weevils in substantial numbers on said plants.

In testimony whereof I affix my signature.

HARRY C. BICKMORE.